United States Patent
Feinstein

(10) Patent No.: US 9,427,941 B2
(45) Date of Patent: Aug. 30, 2016

(54) HYBRID SMART ASSEMBLING 4D MATERIAL

(71) Applicant: Peter A. Feinstein, Shavertown, PA (US)

(72) Inventor: Peter A. Feinstein, Shavertown, PA (US)

(73) Assignee: Feinstein Patents, LLC, Shavertown, PA (US)

( * ) Notice: Subject to any disclaimer, the term of this patent is extended or adjusted under 35 U.S.C. 154(b) by 0 days.

(21) Appl. No.: 14/611,807

(22) Filed: Feb. 2, 2015

(65) Prior Publication Data

US 2016/0221308 A1 Aug. 4, 2016

(51) Int. Cl.
| | |
|---|---|
| *A61F 5/00* | (2006.01) |
| *B32B 25/04* | (2006.01) |
| *B32B 27/12* | (2006.01) |
| *B32B 15/14* | (2006.01) |
| *B32B 5/02* | (2006.01) |
| *B32B 15/08* | (2006.01) |
| *B32B 15/04* | (2006.01) |
| *A61F 13/00* | (2006.01) |

(52) U.S. Cl.
CPC ............... *B32B 25/04* (2013.01); *A61F 13/00* (2013.01); *B32B 5/028* (2013.01); *B32B 15/04* (2013.01); *B32B 15/08* (2013.01); *B32B 15/14* (2013.01); *B32B 27/12* (2013.01); *B32B 2311/005* (2013.01); *B32B 2535/00* (2013.01)

(58) Field of Classification Search
CPC .......... A61B 2017/00867; A61B 2017/00871; A61B 2017/00004; A61B 18/18; A61B 18/1815; A61B 19/20; A61B 2018/00023; A61B 2018/00077; A61B 2018/0022; A61B 2018/00267; A61B 2018/00273
USPC .............. 602/7, 41–54; 606/228; 434/445 R; 623/1.18
See application file for complete search history.

(56) References Cited

U.S. PATENT DOCUMENTS

| | | | |
|---|---|---|---|
| 7,938,923 B2 | 5/2011 | Hood | |
| 8,354,170 B1 | 1/2013 | Henry et al. | |
| 8,734,703 B2 | 5/2014 | Havens et al. | |
| 8,921,473 B1* | 12/2014 | Hyman | C08K 3/04 423/445 R |
| 2004/0015187 A1* | 1/2004 | Lendlein | A61B 17/06166 606/228 |
| 2008/0287582 A1 | 11/2008 | Weiss | |
| 2010/0249682 A1* | 9/2010 | Rousseau | A61F 13/04 602/7 |
| 2011/0112647 A1 | 5/2011 | Hogendijk et al. | |

(Continued)

FOREIGN PATENT DOCUMENTS

| | | |
|---|---|---|
| CN | 102430156 A | 5/2012 |
| CN | 103160948 A | 6/2013 |

*Primary Examiner* — Michael Brown
(74) *Attorney, Agent, or Firm* — St. Onge Steward Johnston & Reens, LLC

(57) ABSTRACT

A material includes a composite having a shape memory material and a non-shape memory material, a trigger source in communication with the shape memory material, the trigger source being configured to provide a stimulus to the shape memory material, the composite being configured to transition between a memorized shape and multiple temporary shapes upon receipt of a stimulus, wherein the composite is configured to self-assemble into a first temporary shape around an underlying object in response to a first trigger from the trigger source and to stop self-assembly in response to a second trigger from the trigger source. Examples contemplated include but are not limited to an immobilization and fixation device for treating a body part of a patient, wearable technology, and a wrapping material for covering one or more objects for transport, each of which includes the aforementioned material.

16 Claims, 10 Drawing Sheets

(56) References Cited

U.S. PATENT DOCUMENTS

| | | |
|---|---|---|
| 2012/0000251 A1 | 1/2012 | Hu et al. |
| 2012/0196100 A1 | 8/2012 | Boyce et al. |
| 2013/0150951 A1* | 6/2013 | Jordan .................... A61F 2/88 623/1.18 |
| 2013/0291399 A1 | 11/2013 | Fonte et al. |
| 2013/0303957 A1 | 11/2013 | Bauerfeind |

* cited by examiner

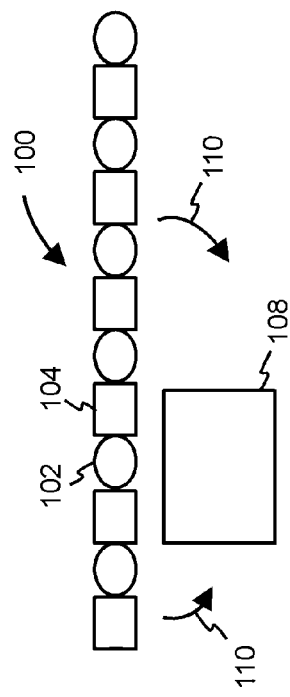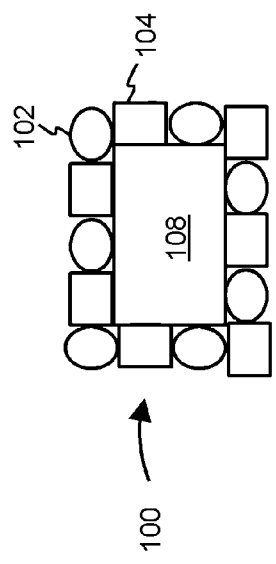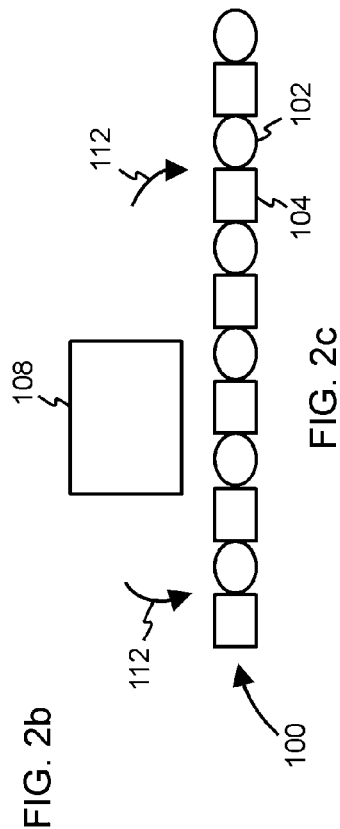

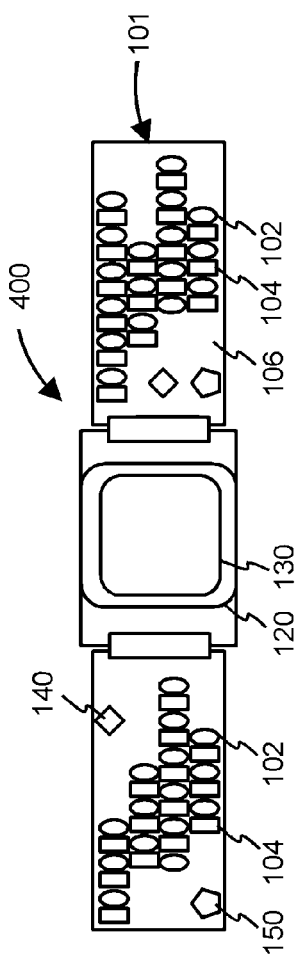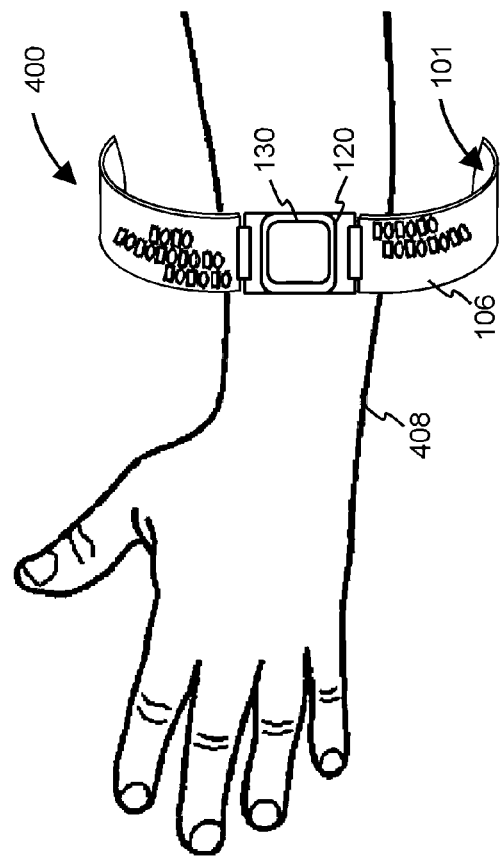
FIG. 7a
FIG. 7b

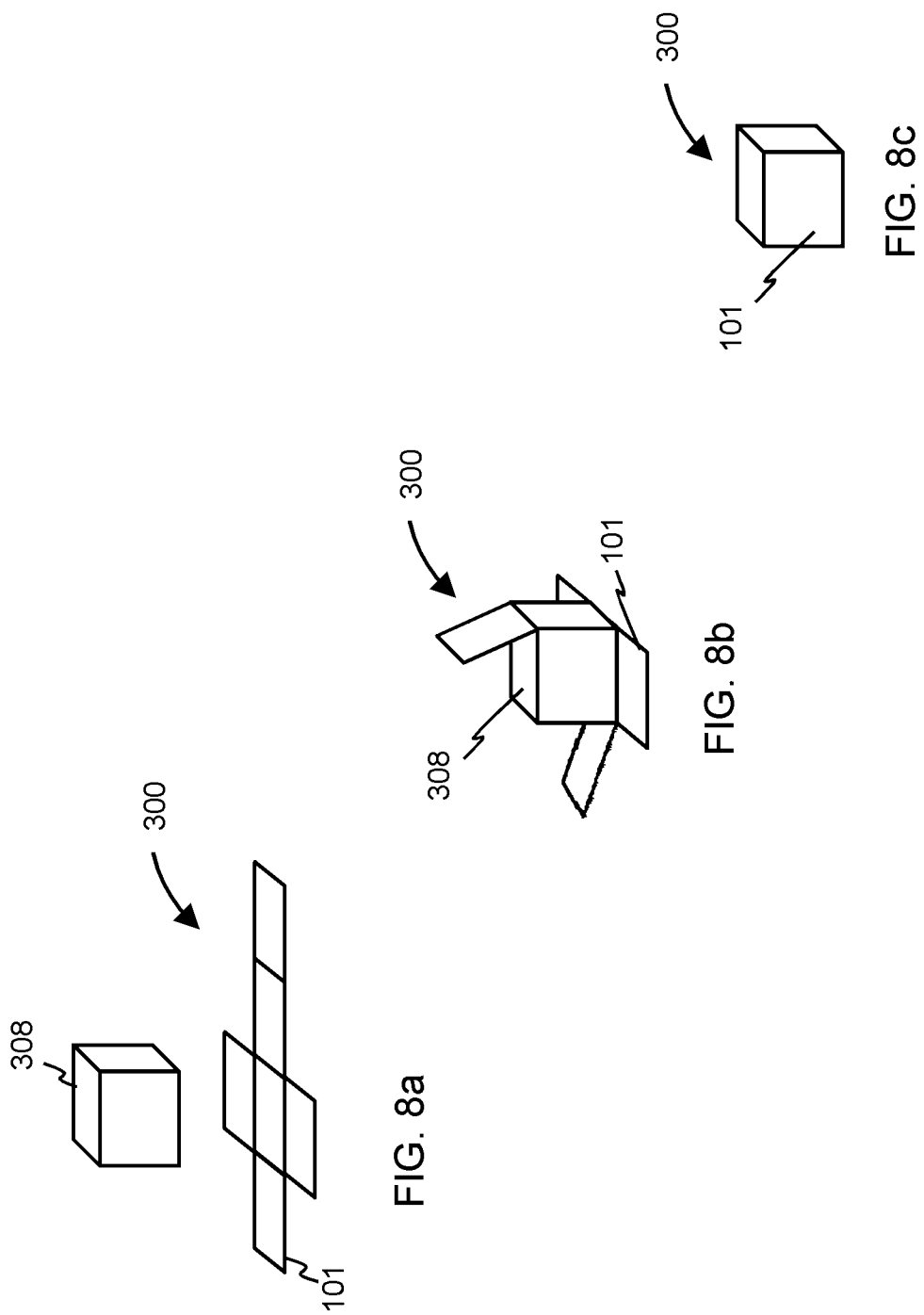

HYBRID SMART ASSEMBLING 4D MATERIAL

FIELD OF THE INVENTION

The invention relates to a hybrid smart/self-assembling 4D material and the production of such a hybrid 4D material, and more specifically a smart material or apparatus that self assembles around an underlying object in response to a stimulus and provides adaptive shape adjustment based on the shape of the underlying object and on the amount of force and/or pressure exerted on the underlying object. The hybrid 4D material is produced by manufacturing processes in general, a specific example of which presented herein is 4D-printing technology.

BACKGROUND OF THE INVENTION

Within the field of material science, there has been an increasing study and development of shape memory polymers and shape memory alloys. A shape memory polymer ("SMP") is a type of smart material with the ability to return from a deformed state (temporary shape) to its original (e.g., baseline, memorized, permanent) shape induced by an external stimulus. For example, an SMP can exhibit change from a rigid state to an elastic state, then back to the rigid state using an external stimulus. The SMP in the elastic state can recover its "permanent" shape if left unrestrained. In similar respects, a shape memory alloy ("SMA") is an alloy that remembers its original shape and after undergoing deformation, is able to transform back to its pre-deformed, original shape when triggered to do so.

Further, an effort in researching and implementing manufacturing processes for 4D printing technology—i.e., self-organizing and/or self-assembly materials—has begun. 4D printing is directed towards the evolution of a fourth dimension in traditional 3D printing, where an object produced and fixed in one shape can later be changed to take on a new shape. For example, a material comprising SMPs or SMAs is created with an initial configuration using a 3D printer and thereafter, the "programmed" or "memorized" reshaping of the SMPs or SMAs applies a time factor/dependence to the configuration.

Some attempts have been made to develop applications for 4D printing technology and/or shape memory materials. For example, Chinese Patent No. 103160948 to Luo discloses a rapid prototyping of shape memory polymer materials using 4D printing. The method of prototyping involves: using a 3D printer to print the SMP material suitable for a 3D object; heating the SMP material to a transition temperature; imposing an external force on the softened SMP material to stretch or twist it; cooling down the SMP material while maintaining the deformation in order to fix a temporary shape; and wherein the SMP material can spontaneously recover from the deformation and return to its original shape in the presence of an appropriate condition. However, the printed SMP material and method of making such material does not include self-assembly capabilities. That is, Luo fails to teach the material having properties concerning self-application and positioning around an underlying object. Further, the printed material is not configured to be shape-adaptive such that the material self-assembles around an underlying object and adapts in shape when there is a change in the shape and profile of the underlying object.

U.S. Patent Application No. 2013/0303957 to Bauerfeind is directed to a medical bandage which can be manually applied to a body part, wherein the bandage has one or more SMP materials that convert between an expanded form and a contracted form to provide support and compression. The bandage may comprise two SMP materials configured as counteracting actuators, in the manner of flexor and extensor, in order to provide quasi-reversible shape transition as a whole from a first shape to a second shape and back. However, this reference does not teach the bandage as being 4D-printed and having the capability to self-assemble around the underlying object and provide adaptive adjustment in shape when there is a change in the shape and profile of the underlying object. Instead, the bandage can be converted from the expanded form, which merely facilitates manual application of the bandage to the body, to the contracted form for compression effect. A person is still required to generally position and orient the bandage with respect to the body part being wrapped. Furthermore, the bandage of Luo is not designed to provide and maintain a specified amount of pressure on the underlying object, even if the underlying object changes in shape, size and/or profile.

U.S. Pat. No. 8,734,703 to Havens et al. discloses an SMP apparatus used to mold and cure a composite material into a composite part having a particular shape. A method of using the apparatus includes applying a composite material to the apparatus, triggering a change in modulus of the apparatus from a rigid state to a malleable state, heating the composite material to a cure temperature, and inducing a pressure differential that drives the apparatus toward the composite material during cure to compress the composite material against a rigid mold. However, the apparatus of Havens does not involve 4D-printing and does not have the capability to self-assemble around an underlying object and readily adjust its shape when the underlying object changes in size and/or shape.

Other references have shown that shape memory materials can be useful in various applications ranging from, for example, shrink wrapping and shrink tubing to medical immobilization and/or fixation devices (e.g., casts, splints, braces). However, a drawback present in these applications is the requirement that the shape memory material be manually or mechanically positioned and/or applied around the underlying object (e.g., shipping crate, injured body part). Further, prior art shape memory materials rely on the chemical characteristics of the particular SMP/SMA used to give one or two different end shape results/permutations, with no gradual or intermediate shapes based on feedback. For instance, after initial setting of the prior art shape memory material, the object underlying the shape memory material may expand and/or contract. The prior art shape memory material—which fail to provide gradualism and intermediate shapes—may cease to be fitted accurately on the underlying object and/or correspond in shape to the underlying object.

Therefore, it would be beneficial to provide a smart material or apparatus which can self assemble around an object without requiring manual or mechanical placement or maneuvering of the device relative to the object. It is further beneficial to provide a device or apparatus which can maintain accurate alignment and fit with the underlying object despite the object expanding or contracting and/or changing shape.

SUMMARY OF THE INVENTION

The needs set forth herein as well as further and other needs and advantages are addressed by the present embodiments, which illustrate solutions and advantages described below.

It is an object of the present teachings to provide a material or apparatus that can be produced from general manufacturing techniques and principles including, 3D printing and 4D printing, and that self-assembles towards a programmed configuration (e.g., shape and size) around an underlying object. Additionally, the shape memory apparatus can be removed efficiently from the underlying object without requiring a separate removal tool (e.g., cutting tool).

It is another object of the present teachings to provide a material or apparatus (e.g., smart material) that readily adjusts its configuration in response to changes in shape and/or size of an underlying object in order to maintain fit and alignment on the underlying object.

It is a further object of the present teachings to provide a material or apparatus (e.g., smart material) that readily adjusts its configuration relative to an underlying object so that the apparatus exerts a constant pressure (e.g., compression) on the underlying object. Similarly, it is an object of the present teachings to provide a shape memory apparatus that readily adjusts its configuration relative to an underlying object so that different parts of the apparatus maintain the same or substantially the same pressures on respective parts of the underlying object.

It is still another object of the present teachings to provide a medical immobilization and fixation device which can self-assemble around an injured body part of a patient in a fitted manner and be readily reconfigured to provide an optimal form of therapeutic treatment or different forms of therapeutic treatment to the body part. More specifically, it is an object to provide an immobilization and fixation device which can be readily set and reset in order to adjust the size and/or shape of the device to accommodate changes in the size and/or shape of the body part. In addition, by enabling the immobilization and fixation device to be set and reset in real-time, proper alignment for fracture reduction can be maintained constantly and a snug fit with the patient's body can be provided throughout treatment of the patient's injury.

It is still another object of the present teachings to provide a device which can self-assemble around a body part in a fitted manner and be readily reconfigured to provide an optimal form of the device. This applies to fitness bands, wearable technology, jewelry, and clothing accessories such as belts, clips, elastic bands, springs, etc. The device can readily set and reset in order to adjust its size and/or shape to accommodate changes in the size and/or shape of the underlying body part. In addition, by enabling the device to set and reset in real-time, proper fitting and sizing can be maintained constantly and a snug fit with the patient's body can be provided without causing discomfort.

It is yet another object of the present teachings to provide wrapping (e.g., shrink wrap) material or apparatus that can self-assemble around an object and provide optimal covering of the object with a constant pressure exerted thereon despite any expansion or contraction of the object.

The material or apparatus (e.g., smart material) according to one embodiment of the present teachings includes, but is not limited to, a composite, a trigger source in communication with the composite to provide a stimulus, wherein the composite is configured to transition between a memorized (e.g., permanent) shape and multiple temporary shapes upon receipt of a stimulus. The phrase "in communication with" with respect to the trigger source can mean that the trigger source has an effect, provides an effect, produces an effect on, and/or induces an effect on the shape memory material. The composite is configured (e.g., 4D-printed or manufactured by another process or technique) to self-assemble into a first temporary shape around an underlying object (e.g., package, body part) in response to a first trigger from the trigger source and to stop self-assembly in response to a second trigger from the trigger source. The composite includes at least one shape memory material and at least one non-shape memory material. The trigger source, in particular, is adapted to communicate with the shape memory material in order to induce shape transition in the composite.

The shape memory material may be formed from of one or more shape memory polymers (SMPs) or one or more shape memory alloys (SMAs). Still, in other embodiments, the shape memory material includes a mix of SMP(s) and SMA(s). Both SMP and SMA have the ability to transition between different shapes, and more specifically, have the ability to revert from a temporary shape (e.g., deformed state) to a memorized shape (e.g., original/pre-deformed/permanent state). When a stimulus is applied or fed to the shape memory material, the modulus of elasticity of the material can change from a rigid or semi-rigid state to a flexible, malleable state suitable for reshaping and stretching the material.

The stimulus which the trigger source provides may comprise a physical stimulus, a chemical stimulus, or a combination of the two. For example, the physical stimulus is an input of energy, such as thermal radiation, contact heat, convection, induction, electromagnetic radiation, exposure to ultrasound or x-rays, electrical current, electrical voltage changes, and combinations thereof. That is, the composite can transition in shape when it is exposed to electricity (for example a specific voltage and/or current), light (e.g., generally or at a specific wavelength) or other electromagnetic radiation, liquid solution (e.g., water), temperature variations (e.g., cooled or heated), pH variations, variations in gas concentration, and/or variations in nutrient concentrations (for biologics). The chemical stimulus involves exposing a chemical agent or catalyst to the SMPs to produce a chemical reaction, wherein the chemical reaction induces the composite to experience shape transition.

In some embodiment of the smart material, the first trigger which initiates self-assembly of the composite around the underlying object may be achieved by way of the trigger source applying a first stimulus to the shape memory material. The second trigger which discontinues the self-assembly process of the composite may be achieved by stopping the trigger source in applying the first stimulus. This configuration is analogous to an on-off switching routine.

In other embodiments, the smart material comprises more than one shape memory material, and preferably two shape memory materials. The two or more shape memory materials provide counteracting actuation and thus function similar to muscle contraction. Specifically, the two or more shape memory materials are adapted to counteract one another so that the composite is able to self-assemble from a memorized shape to a first temporary shape, cease self-assembly and maintain the first temporary shape, and thereafter disassemble from the first temporary shape back to the memorized shape. Additionally, the counteracting actuation of the two or more shape memory materials provides for adaptive adjustment (gradualism) of the composite from the first temporary shape to other temporary shapes in order to compensate for changes in shape and/or size of the underlying object.

The counteracting actuation, for example, involves a first shape memory material being configured to shape transition in a first direction in response to a first trigger and a second shape memory material being configured to shape transition in a second, opposite direction in response to a second trigger. The first trigger comprises the trigger source applying a first stimulus to the first shape memory material to initiate self-assembly of the composite, while the second trigger comprises the trigger source applying a second stimulus to the second shape memory material so that the second shape memory material exerts a force equal and opposite to a force exerted by the first shape memory material, thereby stopping the self-assembly process. In some embodiments, the first stimulus (to the first shape memory material) and the second stimulus (to the second shape memory material) may be the same kind (e.g., application of electricity). In other embodiments, the two stimuli differ from each other (e.g., the first stimulus is the application of light to the first shape memory material, and the second stimulus is the application of electricity to the second shape memory material). Further, by adjusting the amount, rate, intensity, etc. of the stimuli, the force exerted by one shape memory material may be greater than the force of the other shape memory material, thereby achieving an increase or decrease in the shape of the composite from the first temporary shape (adaptive shape adjustment). Alternatively, or in addition, changing the kind of stimulus applied to the respective shape memory materials can provide for intermediate adjustment in shape of the composite.

The adaptive shape adjustment of the composite is a key feature of the present teaching because the underlying object may experience changes in size and/or shape while being covered by the smart material. Moreover, the adaptive shape adjustments helps to maintain the pressure or compressive force on the underlying object at a substantially constant value.

The smart material, in some embodiments, further comprises at least one sensor disposed in the composite, wherein the sensor measures the pressure, load, stress, strain, and/or bend experienced by the composite while assembled around the underlying object. It is advantageous if the sensor is flexible, which allows for easy manipulation during shape transition of the composite. However, the sensor may be semi-rigid or rigid without substantially preventing shape transition of the composite.

A controller or control unit may also be included in the smart material, or may be independently located in a unit completely separate from the smart material/device/apparatus, wherein the control unit is communicatively connected to the trigger source and the at least one sensor. The control unit has feedback loop chips, circuitry, and/or control algorithms which serve to maintain micro as well as macro environmental parameters critical to the functions, requirements, and/or uses of the smart material by controlling when and how the trigger source feeds a stimulus to the shape memory material. The control unit regulates the specific stimulus transmitted to the shape memory material to achieve appropriate shape transition. That is, the control unit controls self-assembly and adaptive shape adjustment of the composite using the pressure, load, stress, strain, and/or bend measurements from the at least one sensor.

During self-assembly of the composite, the control unit instructs the trigger source to continue applying the first trigger to the shape memory material until a pre-determined pressure value is detected by the sensor, at which point the control unit instructs the trigger source to apply the second trigger. After the composite self-assembles around the underlying object and exerts a compressive force at the pre-determined pressure value, the control unit adjusts in real-time the first temporary shape into another temporary shape upon detecting a change in measurements provided by the sensor, so that the compressive force is maintained at the pre-determined pressure value.

In some embodiments, the smart material also comprises a plurality of modules distributed throughout the composite, wherein the modules are connected to the trigger source and are configured to transmit and administer the stimulus to the composite to initiate shape transition.

The present teachings further provide for a medical immobilization and fixation device for treating a body part of a patient, the device comprising the aforementioned smart material. In particular, the immobilization and fixation device comprises a composite having a shape memory material and a non-shape memory material, the composite further comprising a fabric layer on which the shape memory material and the non-shape memory material are deposited. A trigger source is in communication with the shape memory material and configured to provide a stimulus to the shape memory material. The composite is configured to transition between a memorized shape and multiple temporary shapes upon receipt of a stimulus, wherein the composite is configured (e.g., 4D-printed or manufactured by some other process or technique) to self-assemble into a first temporary shape around a body part (i.e., underlying object) in response to a first trigger from the trigger source and to stop self-assembly in response to a second trigger from the trigger source. The composite assembled into the first temporary shape and (other intermediate temporary shapes) provides strength and weight-bearing support to the body part.

The immobilization and fixation device also includes at least one flexible sensor measuring at least one of pressure, stress or strain of the composite on the body part, as well as a control unit to regulate the application of stimulus to the shape memory material and thereby control shape transition. The control unit is adapted to initiate self-assembly of the composite around a body part, wherein the composite (without any or limited external help) wraps around and envelopes an appendage like a cast or blood pressure cuff. The control unit can regulate the self-assembly process so that the composite achieves a first temporary shape that corresponds closely to the shape, size and profile of the appendage. Such regulation can be performed through a process of feedback control using the at least one sensor. Alternatively or in addition, such regulation can be performed using shape, size and profile data entered into the control unit. By means of the control unit, the degree of compressive force exerted by the composite on the appendage can be set (at a predetermined amount) such that an appropriate form of treatment (e.g., patient-customized treatment) or different forms of therapeutic treatment is provided by the device to the appendage. For example, as the appendage begins to heal (e.g., swelling dissipates, bone alignment improves), the appendage can change in shape and/or size. To continue applying appropriate therapeutic treatment to the appendage, the control unit can force the composite to adjust in shape and/or size in corresponding manner to compensate for the changes in shape and/or size of the appendage.

The present teachings also provide for a wrapping material adapted for covering one or more object for transport and/or storage, the wrapping material comprising the aforementioned smart material. In particular, the wrapping material includes a composite having a shape memory material and a non-shape memory material, the composite further comprising a fabric layer on which the shape memory material and the non-shape memory material are deposited. The wrapping material also includes a trigger source in communication with the shape memory material, the trigger source being configured to provide a stimulus to the shape memory material. The composite is configured to transition between a memorized shape and multiple temporary shapes upon receipt of a stimulus. The composite is configured (e.g., 4D-printed or manufactured by some other process or technique) to self-assemble into a first temporary shape around the one or more object in response to a first trigger from the trigger source and to stop self-assembly in response to a second trigger from the trigger source, wherein the composite assembled into the first temporary shape can hold the one or more objects in fixed or stationary manner.

The wrapping material is beneficial, for example, with respect to bulk wrapping foods (e.g., fruit, vegetables) on a pallet for transport and delivery. The wrapping material could be used instead of conventional shrink wrapping. The wrapping material in accordance to the present teachings can be programmed to self-assemble around the food while limiting the amount of pressure exerted by the composite on the food, in order to minimize damage to the food (e.g., bruising on fruits or vegetables).

The smart material according to the present teachings may also be incorporated into clothing, for example wearable technology (e.g., wrist watches, exercised bands, fitness monitoring devices). As an example, an exercise band—before being donned—is in a flat configuration. When a person wants to use the exercise band, the smart material can be instructed to self-assemble around the person's wrist or arm, thereby changing from the initial, flat configuration into a substantially cylindrical configuration. Pressure sensors in the smart material help keep the exercise band in constant contact with the underlying object (e.g., wrist or arm) with a pressure that is comfortable to the wearer and also will be consistent with the device's needs for certain pressures of contact to obtain data and feedback which the device was designed to collect and/or analyze.

BRIEF DESCRIPTION OF THE DRAWINGS

FIGS. 2a-2c are step views of the material of FIG. 1 undergoing self-assembly around an underlying object and thereafter disassembly from the underlying object.

FIGS. 7a-7b perspective views of clothing (e.g., wristband, watch, jewelry, belt) comprising the material of FIG. 1.

FIGS. 8a-8c are step views of a wrapping material or apparatus comprising the material of FIG. 1, undergoing self-assembly around an underlying object and thereafter disassembly from the underlying object.

DETAILED DESCRIPTION OF THE INVENTION

The present teachings are described more fully hereinafter with reference to the accompanying drawings, in which the present embodiments are shown. The following description is presented for illustrative purposes only and the present teachings should not be limited to these embodiments. Any system or controller configuration and architecture satisfying the requirements described herein may be suitable for implementing the energy cell regenerative system and method of the present embodiments.

As used herein, the term "shape memory material" can encompass a shape memory polymer, shape memory alloy, a mixture, composite, and/or compound material or fabric comprising one or more SMAs and SMPs. The SMP, SMA, mixture, composite, compound or fabric are shaped in such a manner such that they may feature distinctively shaped shape transitions, having different shape transition conditions, which may be initiated by different external factors or stimuli. The combination of different SMPs and/or SMAs provides a material that demonstrates one or more "temporary" shape/state characteristics and one or more "memorized" (e.g., permanent) shape/state characteristics. Accordingly, various shape transitions may be achieved.

Figure 1:
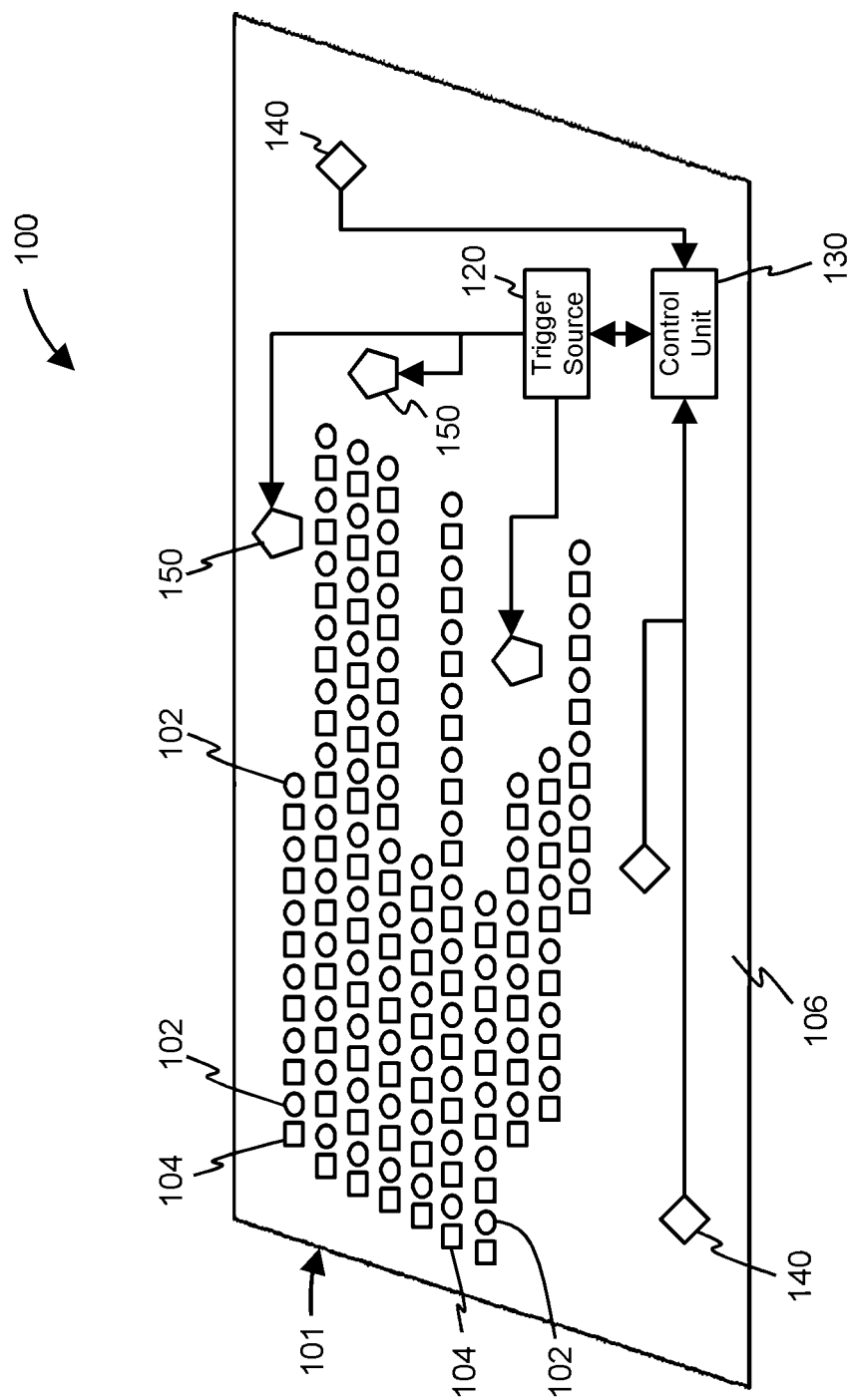
FIG. 1 is a perspective view of the material have self-assembly and adaptive shape adjustment capability in accordance with the present teachings.

Referring to the figures in detail and first to FIG. 1, there is shown an exemplary embodiment of a smart material or apparatus. The smart material or apparatus 100 comprising a composite 101, which includes a shape memory material 102 and a non-shape memory material 104, and a trigger source 120 in communication with the shape memory material 102. The phrase "in communication with" with respect to the trigger source can mean that the trigger source has an effect, provides an effect, produces an effect on, and/or induces an effect on the shape memory material (e.g., transmit electricity to the shape memory material, pass a liquid to the shape memory material; transmit heat/cooling to the shape memory material; irradiate the shape memory material; adjust pH of shape memory material; effect a chemical reaction in the shape memory material). The trigger source is configured to provide or convey a stimulus to shape memory material 102 and induce shape change. The composite material 101 is designed so that it can transition—via the shape memory material 102—between a memorized (e.g., permanent) shape and multiple temporary shapes upon receiving a stimulus from the trigger source 120. The composite 101 is configured (e.g., 4D-printed or manufactured by some other process or technique) so that it may self-assemble into a first temporary shape (see FIG. 2b) around an underlying object 108 (e.g., package, body part) in response to a first trigger from the trigger source 120 and to stop self-assembly in response to a second trigger from the trigger source 120.

The shape transition which the smart material can perform is demonstrated in FIGS. 2a-2c. FIG. 2a shows the smart material 100 in an initial configuration, wherein the composite 101—and more specifically the shape memory material 102—is configured in a memorized shape. In this particular case, the memorized shape is a flat shape. When a first trigger (e.g., stimulus) is transmitted by the trigger source 120 to the shape memory material 102, the composite 101 begins to self assemble in a direction 110 from the memorized shape (FIG. 2a) towards a first temporary shape (see FIG. 2b), which surrounds the underlying object 108. When the trigger source 120 applies a second trigger (e.g., cease stimulus, or apply different stimulus), the composite 101 ceases to self-assemble. Thereafter, if a "removal" trigger is transmitted by the trigger source to the shape memory material, the composite automatically disassembles in a direction 112 opposite to the direction 110, thereby reverting back to its memorized shape (e.g., flat shape), as shown in FIG. 2c.

During 4D printing (or other manufacturing or production process) of the smart material, the shape memory material 102 may be "programmed" with the memorized shape, and in some cases, the first temporary shape, depending on the required end result and objective for the smart material. That is, if the purpose of the smart material is to cover a square object (e.g., shipping package, see FIGS. 2a-2c), then the shape memory material may be programmed to memorize a flat permanent shape from which the composite can assemble and to which the composite can later revert in disassembly. The shape memory material may further be programmed to remember the first temporary shape being a square with dimensions corresponding to the underlying square object. Accordingly, upon self assembly, the composite knows generally how to transition in shape to surround or enclose the underlying object in a fitted manner.

Referring back to FIG. 1, the composite 101 may comprise one or more shape memory material 102 and one or more non-shape memory material 104. In some embodiments, the non-shape material(s) 104 is embedded with the shape memory material 102. The shape memory material 102 may be formed from of one or more shape memory polymers (SMPs) or one or more shape memory alloys (SMAs). Still, in other embodiments, the shape memory material includes a mix of SMP(s) and SMA(s). When a stimulus is applied or fed to the shape memory material, the modulus of elasticity of the material can change from a rigid or semi-rigid state to a flexible, malleable state suitable for reshaping and stretching the material.

Some examples of SMPs used in the smart material 100 include, but are not limited to, polyesters, polycarbonates, polyethers, polyamides, polyimides, polyacrylates, polyvinyls, polystyrenes, polyurethanes, polyethylene, polyether urethanes, polyetherimides, polymethacrylates, polyoxymethylene, poly-ϵ-caprolactone, polydioxanone, polyisoprene, styrene copolymer, styrene-isoprene-butadiene block copolymer, cyanate ester, copolymers of stearyl acrylate and acrylic acid or methyl acrylate, norbonene or dimethaneoctahydronapthalene homopolymers or copolymers, malemide, silicones, natural rubbers, synthetic rubbers, and mixtures and compositions thereof. Further the SMPs may be reinforced or unreinforced SMP material. It should be understood that the above listing is not all inclusive and that there are other types of SMPs which can be designed to meet specific needs and functions of the present invention.

Some examples of SMAs used in the smart material 100 include, but are not limited to, copper-aluminum-nickel alloys, nickel-titanium alloys, copper-zinc-aluminum alloys, iron-manganese-silicon alloys, gold-cadmium, brass, ferromagnetic, other iron-based alloys, and copper-based alloys. An example of one such well known metal based SMA is Nitonol.

The non-shape memory material 104 may comprise, but is not limited to, one or more of the following materials: plastic, metal, rubber, fabric, mesh or ceramic. The non-shape memory material 104 provides some rigidity and structural stability to the overall arrangement of the smart material. However, it should be understood that the non-shape memory material 104 does not prevent the composite 101 as a whole from transitioning between different shapes.

The composite 101 may further comprise a base film or mesh layer 106, wherein the shape memory material 102 and the non-shape memory material 104 are embedded in or deposited on the surface of the mesh layer 106. The mesh layer 106 may comprise a plastic material or textile (e.g., fabric) material. The process of combining or intercalating the mesh layer 106 and shape memory materials 102 and non-shape memory materials 104 may involve threading, casting, coating, welding, and/or bonding.

Figure 3A:
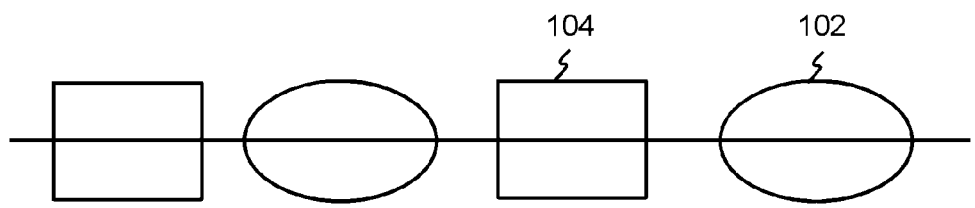
FIGS. 3a-3e are diagrams showing the structure of the material of FIG. 1.
Figure 3B:
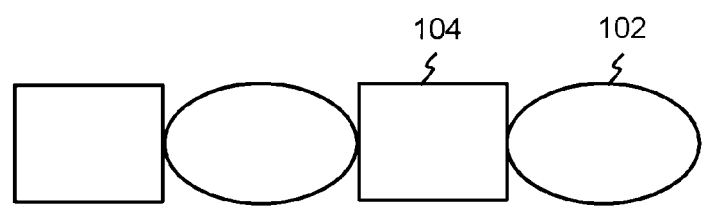
Figure 3C:
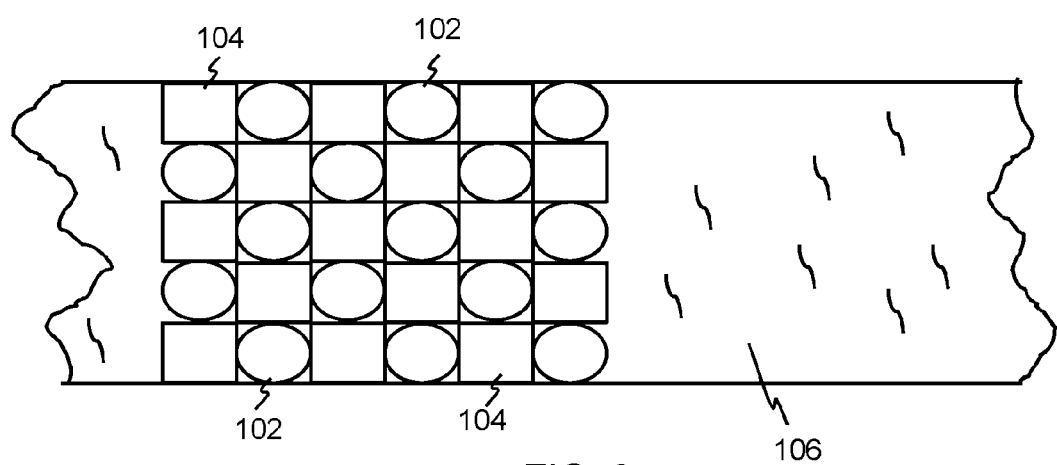
Figure 3D:
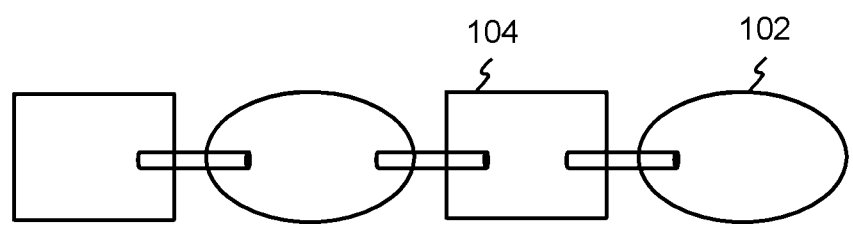
Figure 3E:
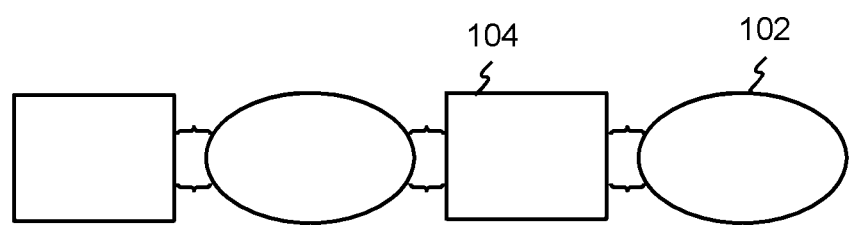

FIGS. 3a-3e illustrate different embodiments of the structure of the composite 101 and the manner in which the shape memory material 102 and the non-shape memory material 104 are connected with one another in alternating manner. The patterns of the materials 102 and 104 incorporated into the composite may differ from the alternating arrangement shown in FIGS. 3a-3e, depending on the final needs and characteristics of the smart material 100. Further the individual size, shape and profile of the materials 102 and 104 are determined by the required product needs and/or architectural/structural requirements of the end product, or engineering requirements of the end product. In FIG. 3a, the materials 102 and 104 are connected with one another via a string concept, wherein the shape memory material 102 and the non-shape memory material 104 are joined or sewed together as beads on a string, for a fabric type string. FIG. 3b, alternatively, shows direct attachment of the two materials, by means of casting coating, welding, fusing and/or bonding. FIG. 3c illustrates the shape memory material 102 and the non-shape memory material 104 deposited on top of a mesh layer 106 in a lattice or matrix framework. This framework of materials 102 and 104 can be interlocked with the mesh layer 106 (e.g., fabric, textile sheet). In addition, the lattice of shape memory material and non-shape memory material may be combined with thermoplastic materials interwoven or interlaced therebetween. FIG. 3d shows composite arrangement wherein the shape memory material 102 and the non-shape memory material 104 are connected to each other via fasteners 114. For example, screws may be used to fasten the materials 102 and 104. FIG. 3e, in contrast, shows the shape memory material 102 and the non-shape memory material 104 are attached to one another via an adhesive 116.

The configuration of the composite 101 may mimic a hinge, as found on a door or similar opening and closing device, connected to a control unit to provide repetitive motion, based on sensor feedback. For example, in a case where the smart material self-assembles around a body part, the control unit can control the trigger source 120 to stimulate the shape memory material to shape transition back and forth between two states in a repetitive manner, thereby providing a rubbing and/or kneading motion on the body part (i.e., massaging the body part).

The various arrangements of the shape memory material 102 and the non-shape memory material 104, provided in FIGS. 3a-3e, are assembled either by mold manufacturing or via 3D/4D printing or other means.

Referring back to FIG. 1, the trigger source 120 is configured to provide one or more stimulus to the shape memory material 102. The stimulus which the trigger source provides may comprise a physical stimulus, a chemical stimulus, or a combination of the two. The physical stimulus may be an input of energy, such as thermal radiation, contact heat, convection, induction, electromagnetic radiation, exposure to ultrasound or x-rays, electrical current, electrical voltage changes, and combinations thereof. For example, the composite can transition in shape when it is exposed to electricity (for example a specific voltage and/or current), light (e.g., generally or at a specific wavelength) or other electromagnetic radiation, liquid solution (e.g., water), temperature variations (e.g., cooled or heated), pH variations, variations in gas concentration, and/or variations in nutrient concentrations (for biologics). The chemical stimulus involves exposing a chemical agent or catalyst to the SMPs to produce a chemical reaction, wherein the chemical reaction induces the composite to experience shape transition.

In exemplary embodiments of the present teachings, the stimulus is temperature variations, and in particular, an increase in temperature of the shape memory material above a transition temperature, which can be defined by the specific SMP and/or SMA used. The temperature of the shape memory material can be adjusted to a different value by means of heating/cooling modules 150 (e.g., thermoelectric elements, Peltier cooler, heater, heat pump) or by an appropriate chemical process (e.g., plasticizers).

In some embodiments, the stimulus is the transmission of electricity to the shape memory material. By feeding electricity, the shape memory material can induce shape transition in the composite 101. When electricity is cut off, the shape transition may cease. Also, depending on the SMP and/or SMA used, varying the voltage and/or current of the electric energy can induce different shape transitions performed by the composite. For example, if 5V power is supplied to the shape memory material, the composite begins to self assemble towards the first temporary shape. If 3.3V is supplied to the shape memory material, the composite is configured in a malleable state wherein in can increase or decrease in size and/or shape. In other embodiments, exposing the shape memory material to electromagnetic radiation (at different frequencies and/or wavelengths) can achieve the necessary shape transitions of the composite 101.

Another example of the stimulus is the exposure of the shape memory material to a specified quantity or level of moisture. For example, when water or steam directly contacts the SMP and/or SMA thereby increasing the moisture content of the polymer itself and/or the surrounding medium (e.g., mesh layer 106), the SMP and/or SMA begins shape transition.

In other embodiments of the present teachings, the stimulus is a chemical stimulus in the form of a chemical reaction or a change in the composition of the medium surrounding the shape memory material. A change in pH level of the surrounding medium is one example of such chemical stimulus. It is provided that the shape memory material be brought into contact with an aqueous solution having a specific pH value, in order to change the pH of the shape memory material. For example, a change in shape can be produced through contact with an alkaline aqueous solution having a pH of 8 or higher. In contrast, a change in shape can be produced through contact with a solution that has a pH less than 5.

In order to transmit the stimulus throughout the composite 101 and to all shape memory material components 102, the smart material comprises at least one module 150 connected (e.g., wired, wireless) to the trigger source 120. In preferable embodiments, the smart material comprises a plurality of modules 150 distributed throughout the composite 101. The modules 150 are adapted to transmit and administer any type of stimulus provided by the trigger source to the shape memory material to initiate shape transition. For example, the modules 150 may comprise thermoelectric heaters or cooling units. In other examples, the modules 150 comprise fiber optic cables and optical lens systems to convey light from a light source (e.g., trigger source) and shine the light on the shape memory material. Still, the modules 150 may comprise electrical components for transmitting, storing, and passing electricity through the composite 101. In other embodiments, the modules 150 comprise flow lines for transmitting a liquid (e.g., water) or aqueous solution to the shape memory materials. Still in other embodiments, the modules 150 may comprise EM emitters, which can emit radiation at specific frequencies and/or wavelengths.

As described above, the trigger source 120 is designed to transmit a first trigger and a second trigger. In some embodiment of the smart material 100, the first trigger which initiates self-assembly of the composite 101 around the underlying object 108 may be achieved by way of the trigger source 120 applying a first stimulus to the shape memory material. The second trigger which discontinues the self-assembly process of the composite may be achieved by stopping the trigger source from applying the first stimulus.

Alternatively or in addition to the above on-off switching routine of the triggers, the smart material 100 may comprise more than one shape memory material 102, and preferably two shape memory materials. The two or more shape memory materials 102 provide counteracting actuation and thus function similar to muscle contraction. The two or more shape memory materials 102 are adapted to counteract one another so that the composite 10 is able to self-assemble from a memorized shape (see FIG. 2a for example) to a first temporary shape (see FIG. 2b for example), cease self-assembly and maintain the first temporary shape, and thereafter disassemble from the first temporary shape back to the memorized shape (see FIG. 2c for example). Additionally, the counteracting actuation of the two or more shape memory materials 102 provides for adaptive adjustment (gradualism) of the composite 101 from the first temporary shape to other intermediate temporary shapes in order to compensate for changes in shape and/or size of the underlying object 108.

The counteracting actuation feature may be achieved by means of the first trigger for initiating self-assembly of the composite 101 comprising the trigger source applying a first stimulus to the first shape memory material, and by means of the second trigger for stopping self-assembly of the composite comprising the trigger source applying a second stimulus to the second shape memory material. In some embodiments, the first stimulus (to the first shape memory material) and the second stimulus (to the second shape memory material) may be the same kind (e.g., application of electricity). In other embodiments, the two stimuli differ from each other, e.g., the first stimulus is the application of light to the first shape memory material, and the second stimulus is the application of electricity to the second shape memory material. Further, by adjusting the amount, rate, intensity, etc. of the stimuli, the force exerted by one shape memory material may become greater than the force of the other shape memory material, thereby achieving an increase or decrease in the shape of the composite from the first temporary shape (adaptive shape adjustment). Changing the kind of stimulus applied to the respective shape memory materials can also provide for intermediate adjustments in the shape of the composite.

The smart material, as shown in FIG. 1, is designed so that the composite 101 exerts a predetermined pressure on the underlying object 108 and provides adaptive adjustment in shape in order to compensate for any changes in shape and/or size that occur in the underlying object. The ability of the composite to adjust in real-time its shape and size helps to maintain the pressure exerted on the underlying object at a constant or substantially constant. In particular, the smart material 100 comprises at least one sensor 140 disposed in the composite 101, the sensor measuring at least one of pressure, stress or strain of the composite on the underlying object 108. FIG. 1 specifically shows multiple sensors 140 disposed at various positions along the composite 101. The sensors 140 may include load sensors, pressure sensors, strain gauges, stress gauges, bend sensors, piezoresistive force sensors, or any sensors adapted to measure pressure, load, stress, or strain. It is noted that all of the sensor 104 may be of the same type, or alternatively, a mixture of different types of sensors. In preferred embodiments, the sensors 140 are flexible, thereby enabling easy manipulation during shape transition of the composite. However, the smart material functions equally well if the sensors are rigid or semi-rigid. That is, the rigid or semi-rigid sensors do not inhibit or minimally inhibit the composite from changing into different shapes.

FIG. 1 shows the smart material 100 comprising a control unit 130 communicatively connected (e.g., wired, wireless) to the trigger source 120 and the sensor(s) 140. The control unit 130, as shown in FIG. 1 is disposed on or integrated into the composite 101. Alternatively, the control unit 130 can be in an independent unit separated from the composite, wherein the control unit communicates wireless, or even through wired connections or plug-ins, with other parts of the smart material (e.g., trigger source 120, sensors 140, and modules 150). The control unit 130 controls self-assembly and adaptive adjustment of the composite 101 using the measurements provided by the sensor(s) 140. The control unit 130 includes feedback loop chips, circuitry, and/or control algorithms which serve to regulate the specific stimulus transmitted to the shape memory material 102 to achieve appropriate shape transition. That is, the control unit 130 controls self-assembly and adaptive shape adjustment of the composite 101 using the pressure, load, stress, strain, and/or bend measurements from the at least one sensor 140.

During self-assembly, the control unit 130 instructs the trigger source 120 to continue applying the first trigger to the shape memory material 102 until a pre-determined pressure value is detected by the sensor 140, at which point the control unit 130 instructs the trigger source 120 to apply the second trigger. The pre-determined pressure value may be programmed into the control unit. Alternatively, the pre-determined pressure value can be set and adjusted by manual input through the control unit 130.

The control unit may also contain a pressure gauge feedback mechanism that measures the baseline pressure of the underlying object and then applies a differential pressure that is programmed in by the user. For example, this could be a pressure applied by the smart material that is derived from assessing the blood pressure of an extremity of a person and then adding a 10 mm mercury pressure differential to the pressure applied by the smart material.

After the composite 101 self-assembles around the underlying object 108 and exerts a compressive force at the pre-determined pressure value, the control unit 130 adjusts in real-time the first temporary shape into another temporary shape upon detecting a change in measurements provided by the sensor 140, so that the compressive force is maintained at the pre-determined pressure value.

Figure 4:
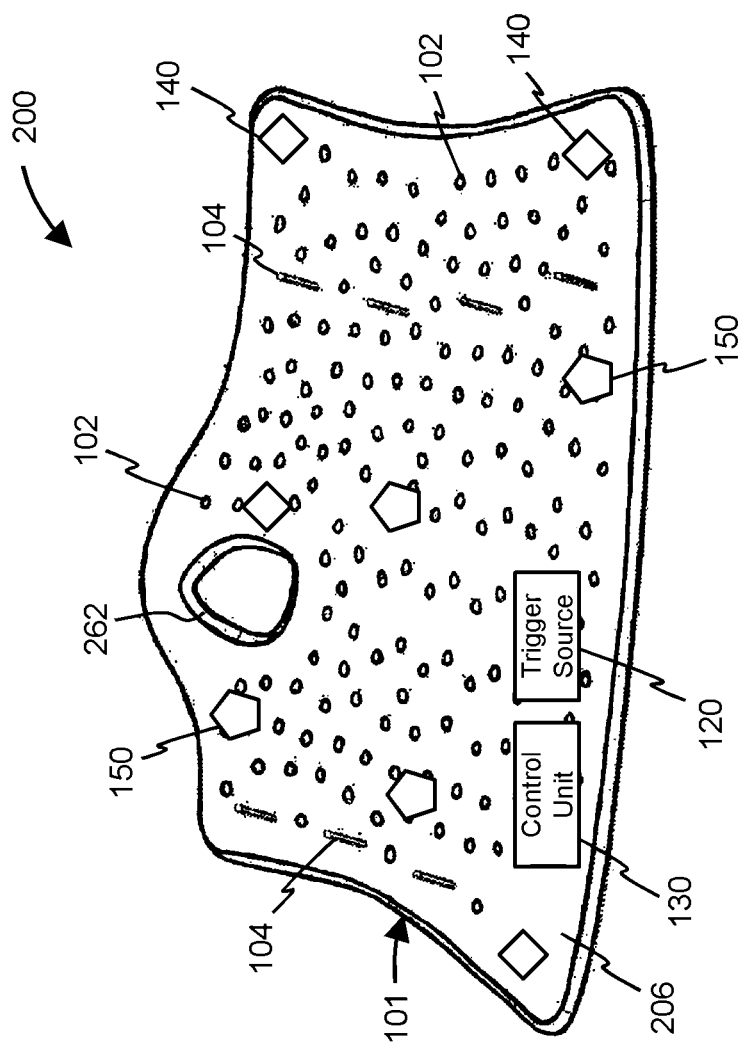
FIG. 4 is a perspective view of an immobilization and fixation device for treating a body part of a patient comprising the material of FIG. 1.
Figure 5:
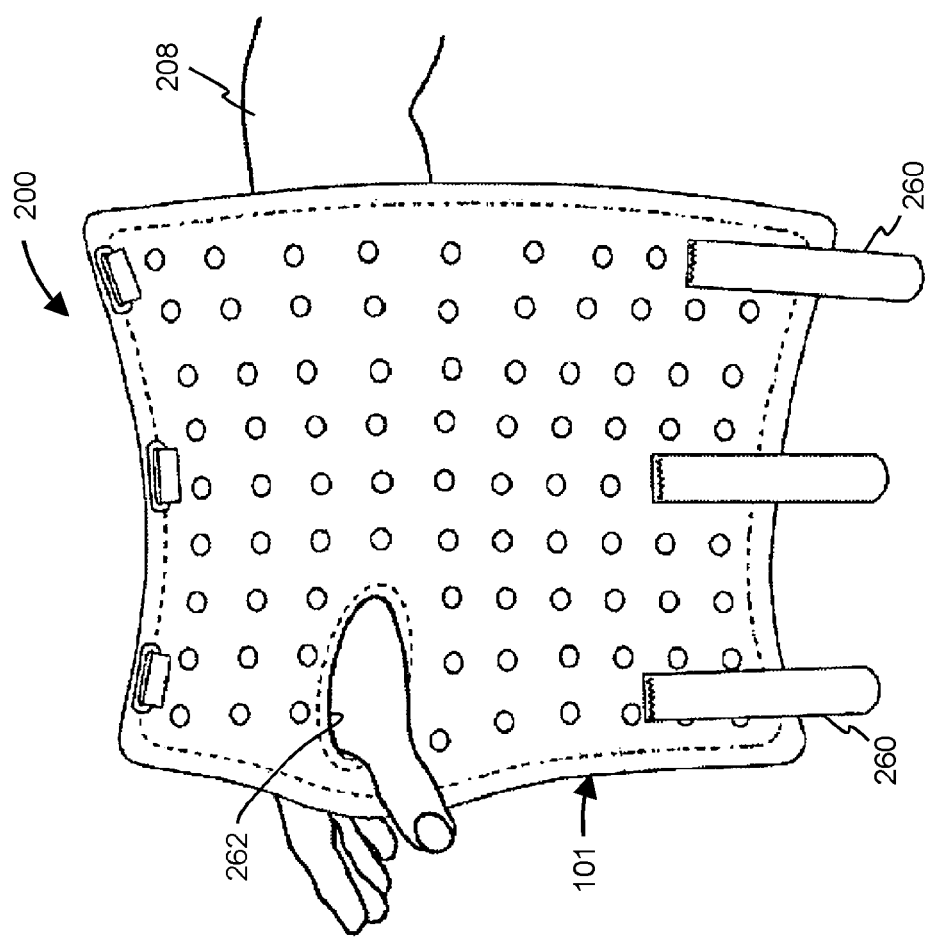
FIG. 5 is a side view of the immobilization and fixation device of FIG. 4 in the process of self-assembly.
Figure 6:
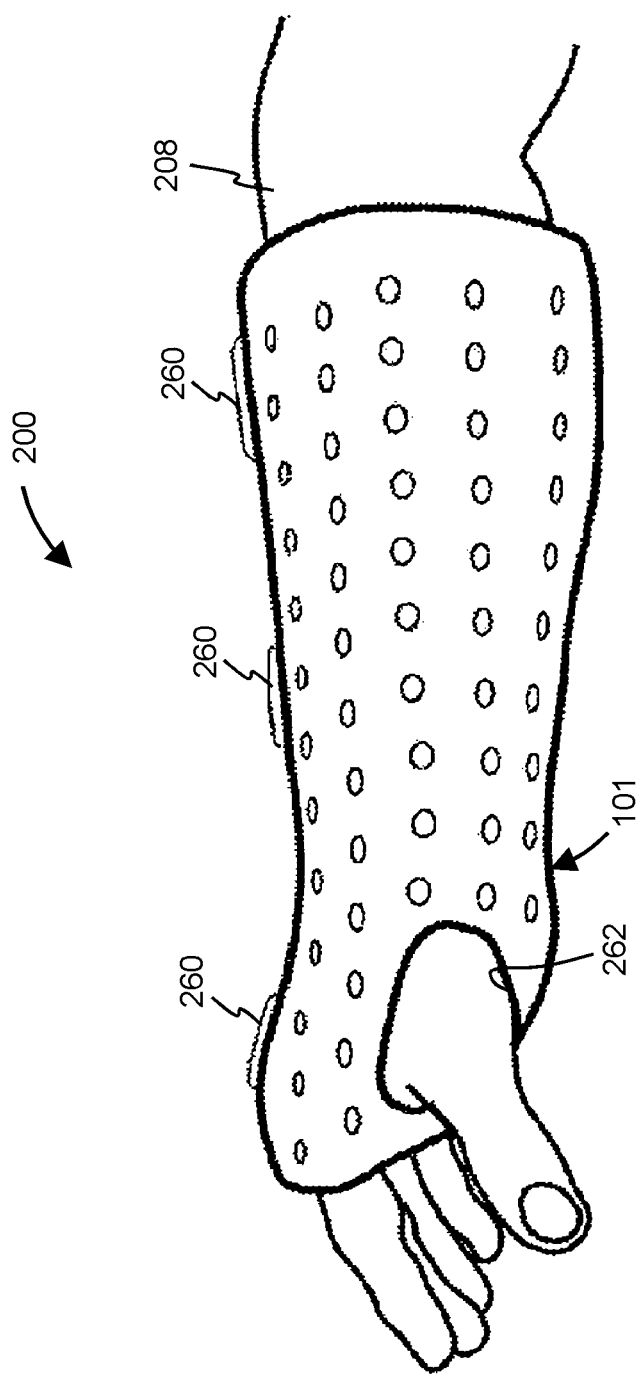
FIG. 6 is a side view of the immobilization and fixation device of FIG. 5 after self-assembly is completed.

FIGS. 4-6 show an immobilization and fixation device for treating a body part of a patient, wherein the device comprises the aforementioned smart material 100. For example, the immobilization and fixation device 200 includes a composite 101 having a shape memory material 102 and a non-shape memory material 104, the composite 101 further comprising a fabric layer 206 on which the shape memory material and the non-shape memory material are deposited. A trigger source 120 is in communication with the shape memory material 102 and configured to provide a stimulus to the shape memory material 102. The composite 101 is configured to transition between a memorized shape and multiple temporary shapes upon receipt of a stimulus, wherein the composite is configured to self-assemble into a first temporary shape around an appendage or body part 208 in response to a first trigger from the trigger source and to stop self-assembly in response to a second trigger from the trigger source. The composite 101 assembled into the first temporary shape (and other intermediate temporary shapes) provides strength and weight-bearing support to the body part 208.

Similarly to the smart material 100, the immobilization and fixation device 200 is configured so that the composite 101 exerts a pressure on the body part 208 and provides adaptive adjustment in shape in order to compensate for changes in shape and/or size of the body part and maintain the pressure substantially constant.

The trigger source 120 of the device 200 is configured to provide one or more stimulus to the shape memory material 102, the stimulus comprising a physical stimulus, a chemical stimulus, or a combination of the two. In some embodiments, the stimulus to invoke shape transition of the composite comprises a change in temperature (temperature variation), the temperature change being produced by using body heat. The trigger source 120 may be designed to retrieve the necessary heat to adjust the temperature of the shape memory material 102 directly from the heat produced by the patient's body.

The immobilization and fixation device 200 also includes at least one flexible sensor 140 measuring at least one of pressure, stress or strain of the composite on the body part 208, as well as a control unit 130 to regulate the application of stimulus to the shape memory material 102 and thereby control shape transition. The control unit 130 is programmed to initiate self-assembly of the composite 101 around a body part 208, wherein the composite (without any or limited external help) wraps around and envelopes an appendage 208 like a cast or blood pressure cuff (see FIGS. 5-6). The control unit 130 can regulate the self-assembly process so that the composite 101 achieves a first temporary shape that corresponds closely to the shape, size and profile of the appendage (see FIG. 6). Such regulation can be performed through a process of feedback control using the at least one sensors 140. Alternatively or in addition, regulation of the composite's shape can be performed using shape, size and profile data entered into the control unit 130 by manual input or through an upload file containing the shape, size and profile data derived from the target shape by direct measurement, photos, virtual reconstructions, and/or other methods derived from devices, such as CAD/CAM computer programs and 3D computer reconstructions that use, but are not limited to, X-rays, CT scans, or MRI scan data. By means of the control unit, the degree of compressive force exerted by the composite on the appendage can be set (at a predetermined amount) such that an appropriate form of treatment (e.g., patient-customized treatment) or different forms of therapeutic treatment is provided by the device to the appendage. As the body part 208 begins to heal (e.g., swelling dissipates, bone alignment improves), it can experience a change in shape and/or size. In order to ensure that an appropriate therapeutic treatment is being applied continuously to the body part 208, the control unit 130 can force the composite 101 to adjust in shape and/or size in corresponding manner to compensate for the changes in shape and/or size of the body part.

As shown in FIGS. 5-6, the device 200 further comprises one or more fasteners 260 for selectively securing the composite 101 around the body part 208 after self-assembly is completed. The fasteners 260 can also assist in the positioning of the device 200 relative to the body part 208.

The fasteners 260 also provide redundancy to the device 200 to ensure that the composite 101 maintains a shape corresponding to the body part 208 and reduces the likelihood that the composite 101 accidentally shifts or is removed from the body part 208.

The immobilization and fixation device 200 may also include one or more holes or apertures 262 formed in the composite 101. The hole 262 is adapted to receive a patient's thumb, fingers, toes, or other digits, as shown in FIGS. 4-6 or accommodate a joint. The hole 262 is preformed in the composite 101, with exact dimensions, during the 4D printing or other type of manufacturing/production process. However, in some embodiments, the composite may not be pre-formed with a hole 262, and instead, a medical practitioner can perforate the composite 101 using scissors or another cutting tool. The medical practitioner, therefore, can customize the hole 262 to the specific size, shape, and position of the patient's digits or joint.

FIGS. 7a-7b shows a piece of clothing or wearable item 400, for example a fitness band, wearable technology, conventional watch, smart watch, jewelry, and clothing accessory (e.g., belts, clips, elastic bands, springs, etc.) which self-assembles to cover and/or surround a body part 408, such as a finger, wrist, arm, waist, neck, ankle, and leg. All the principles described previously are applicable to the wearable item 400. The clothing 400 includes the aforementioned smart material 100. As shown in FIG. 7a, the composite 101 has a shape memory material 102 and a non-shape memory material 104. In some embodiments, the composite of the wearable item also includes a mesh layer 106 (e.g., fabric layer) which serves as a base on which the shape memory material and the non-shape memory material are disposed. For example, the mesh layer may be the part of the wearable item 400 that contacts the body part 408. The wearable item 400 also includes a trigger source 120 in communication with the shape memory material 102, the trigger source being configured to provide a stimulus to the shape memory material. The composite 101 is configured to transition between a memorized shape and multiple temporary shapes upon receipt of a stimulus. The composite 101 is configured to self-assemble into a first temporary shape around the body part 408 in response to a first trigger from the trigger source and to stop self-assembly in response to a second trigger from the trigger source. The composite assembled into the first temporary shape is adapted to affix around the body part and apply a pre-determined amount of pressure on the body part. The above configuration eliminates the need for sizing the wearable item, for example, there is no need for sizing clips/clasps, elastic bands, or springs, nor is there a need for providing belt holes or equivalents thereof.

The wearable item 400 is configured so that the composite 101 provides adaptive adjustment in shape in order to compensate for changes in shape and/or size of the body part and maintain the pressure substantially constant. The pre-determined amount of pressure that the composite exerts can also be adjusted, based on the person's needs, preferences, and/or comfort/discomfort level.

The trigger source 120 of the device 200 is configured to provide one or more stimulus to the shape memory material 102, the stimulus comprising a physical stimulus, a chemical stimulus, or a combination of the two. In some embodiments, the trigger source is disposed on the composite. In other embodiments, for example where the wearable item is a watch (e.g., conventional watch, smart watch) or wearable technology, the trigger source can be positioned within the existing enclosure of the watch or wearable technology (FIG. 7a).

The wearable item 400 also includes a control unit 130 to regulate the application of stimulus to the shape memory material 102 and thereby control shape transition. The control unit 130 is programmed to initiate self-assembly of the composite 101 around a body part 408, wherein the composite (without any or limited external help) wraps around and surrounds the body part 408 (see FIG. 7a). In some embodiments, the control unit 130 is disposed on integrated into the composite. In other embodiments, the control unit 130 can be positioned within the existing enclosure of the watch or wearable technology. The wearable item may also comprise at least one flexible sensor 140 measuring at least one of pressure, stress or strain of the composite on the body part 408. The sensor 140 communicates with the control unit 130 in order to achieve feedback loop control and adaptive adjustment of the composite 101. The amount of pressure exerted on the body part can be adjusted via the control unit 130 according to the wearer's needs, preferences, and/or comfort/discomfort level.

At least one module 150 may be included in the wearable item 400. The module 150 is connected (e.g., wired, wireless) to the trigger source 120. The modules 150 are adapted to transmit and administer any type of stimulus provided by the trigger source to the shape memory material to initiate shape transition.

FIGS. 8a-8c and 9 show a wrapping material or apparatus 300 for covering one or more objects 308, 390 for transport and/or storage, wherein the wrapping material or apparatus 300 comprises the aforementioned smart material 100. Specifically, the wrapping material 300 includes a composite 101 having a shape memory material 102 and a non-shape memory material 104, the composite 101 further comprising a mesh layer (see 106 in FIG. 1) on which the shape memory material and the non-shape memory material are deposited. In some embodiments, the non-shape memory material 104 is embedded with the shape memory material 102. The wrapping material 300 also includes a trigger source 120 in communication with the shape memory material 102, the trigger source being configured to provide a stimulus to the shape memory material. The composite 101 is configured to transition between a memorized shape and multiple temporary shapes upon receipt of a stimulus. The composite 101 is configured to self-assemble into a first temporary shape around the one or more objects 308 in response to a first trigger from the trigger source and to stop self-assembly in response to a second trigger from the trigger source, wherein the composite assembled into the first temporary shape holds the one or more objects in fixed or stationary manner (see FIGS. 8a-8c).

The wrapping material 300 may further comprise a control unit 130, a plurality of sensors 140 and a plurality of modules 150 as described above with respect to FIG. 1.

Figure 9:
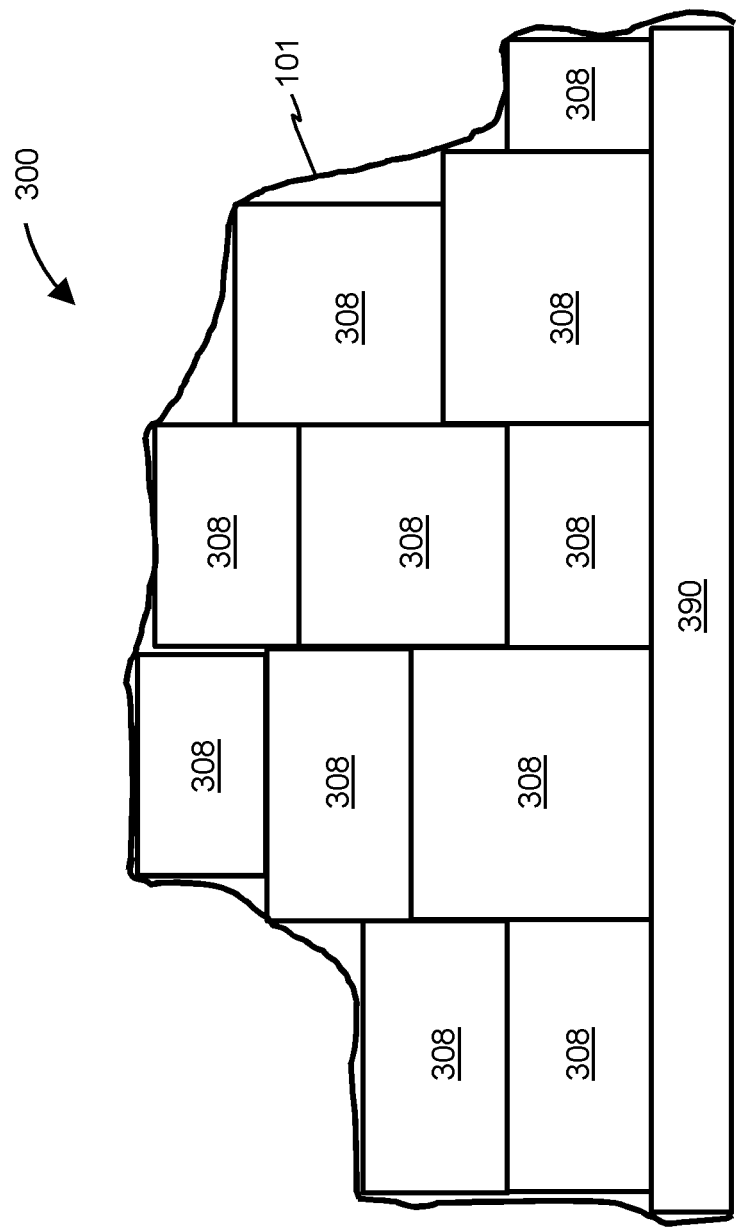
FIG. 9 is a side view of a wrapping material or apparatus comprising the material of FIG. 8, which has self-assembled around a plurality of objects for transport.

FIG. 9, in particular, shows a shipping crate 390 and a plurality of objects 308 which have been enclosed by the wrapping material 300 such that the objects 308 are firmly secured to the shipping crate 390. In some embodiments, the mesh layer of the composite of the wrapping apparatus 300 is made of a material such that a high coefficient of friction is achieved between the mesh layer and the objects 308 and shipping crate 390 in order to minimize movement of the objects 308 relative to each other and to the shipping crate, especially during transport and/or storage.

Another component that may be incorporated into the smart material 100, the immobilization and fixation device 200, and the wrapping material 300 is a personal identification unit (e.g., RFID tag) disposed on or embedded in the composite during the 4D printing or other production process. The composite would be created with the ID unit to detect a finger print, touch point ID (e.g., grip or multiple fingers), retina, voice, password codes. These personal ID features allow for the trigger source and/or control unit to be unlocked so that self assembly and adaptive shape adjustment may be performed. If an ID feature is not recognized, the trigger source and/or control unit remains locked and self assembly and adaptive adjustment may be inhibited. Alternatively or in addition, the personal identification unit may be used to lock the composite in a closed state around the underlying object. Only when a proper ID feature is accepted by the personal identification unit will the trigger source and/or control unit allow for the composite to revert back to its memorized shape (e.g., flat configuration).

Although the smart material according the present teachings has been shown to have applications in the medical immobilization and fixation field and package transporting field, the smart material can have application in various other industries, such as wearable technology, biomedical devices and robotics.

While the present teachings have been described above in terms of specific embodiments, it is to be understood that they are not limited to those disclosed embodiments. Many modifications and other embodiments will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

What is claimed is:

1. A material comprising:
a composite having a shape memory material and a non-shape memory material;
a trigger source in communication with the shape memory material, the trigger source being configured to provide a stimulus to the shape memory material;
the composite being configured to transition between a memorized shape and multiple temporary shapes upon receipt of a stimulus;
wherein the composite is configured to self-assemble from a memorized shape into a first temporary shape around an underlying object in response to a first trigger from the trigger source and to stop self-assembly in response to a second trigger from the trigger source,
wherein the shape memory material comprises two shape memory materials, the two shape memory materials providing counteracting actuation such that a first shape memory material is configured to shape transition in a first direction in response to the first trigger and a second shape memory material is configured to shape transition in a second direction in response to the second trigger, the second direction being opposite the first direction.

2. The material of claim 1, wherein the shape memory material comprises at least one of a shape memory polymer or shape memory alloy.

3. The material of claim 1, wherein the non-shape memory material comprises at least one of plastic, metal, rubber, fabric, mesh or ceramic.

4. The material of claim 1, wherein the non-shape memory material is embedded with the shape memory material in a lattice framework.

5. The material of claim 1, wherein the first trigger for initiating self-assembly of the composite comprises the trigger source applying a first stimulus to the shape memory material, and wherein the second trigger for stopping self-assembly of the composite comprises the trigger source discontinuing application of the first stimulus.

6. The material of claim 1, wherein the first trigger for initiating self-assembly of the composite comprises the trigger source applying a first stimulus to the first shape memory material, and wherein the second trigger for stopping self-assembly of the composite comprises the trigger source applying a second stimulus to the second shape memory material such that the second shape memory material exerts a force equal and opposite to a force exerted by the first shape memory material, the first stimulus being different from the second stimulus.

7. The material of claim 1, wherein the composite exerts a pressure on the underlying object and provides adaptive adjustment in shape in order to compensate for changes in shape and/or size of the underlying object and maintain the pressure substantially constant.

8. The material of claim 7, further comprising at least one sensor disposed in the composite, the sensor measuring at least one of pressure, stress or strain of the composite on the underlying object.

9. The material of claim 8, further comprising a control unit communicatively connected to the trigger source and the sensor, wherein the control unit controls self-assembly and adaptive shape adjustment of the composite based on measurements provided by the sensor, wherein during self-assembly, the control unit instructs the trigger source to continue applying the first trigger to the shape memory material until a pre-determined pressure value is detected by the sensor, at which point the control unit instructs the trigger source to apply the second trigger.

10. The material of claim 9, after the composite self-assembles around the underlying object and exerts a compressive force at the pre-determined pressure value, the control unit adjusts in real-time the first temporary shape into another temporary shape upon detecting a change in measurements provided by the sensor, so that the compressive force is maintained at the pre-determined pressure value.

11. The material of claim 9, wherein the control unit comprises a pressure gauge feedback mechanism which measures a baseline pressure of the underlying object and applies a differential pressure from the baseline pressure.

12. The material of claim 9, wherein the control unit instructs the trigger source to apply multiple triggers to the shape memory material in order to produce repetitive motion in the composite based on sensor feedback.

13. The material of claim 8, wherein the at least one sensor comprises at least one of a load sensor, pressure sensor, strain gauge, stress gauge, bend sensor, or piezoresistive force sensor.

14. The material of claim 1, wherein the stimulus comprises one or more of: application of electric current; application of electromagnetic radiation at a specific wavelength; application of light, application of water; change in temperature; change in pH; or application of chemical agent, which produces a reaction with the shape memory material.

15. The material of claim 1, further comprising a plurality of modules distributed throughout the composite, the modules being connected to the trigger source to administer the stimulus to the composite to initiate shape transition.

16. The material of claim 1, wherein the composite further comprises a mesh layer on which the shape memory material and the non-shape memory material are deposited.

\* \* \* \* \*